(12) United States Patent
Dubief et al.

(10) Patent No.: US 10,842,312 B2
(45) Date of Patent: Nov. 24, 2020

(54) BEVERAGE PREPARATION ASSEMBLY

(71) Applicant: NESTEC S.A., Vevey (CH)

(72) Inventors: Flavien Dubief, Neuchatel (CH); Lucio Scorrano, Yverdon-les-Bains (CH); Larry Baudet, Denges (CH); Kevin Jamolli, Bursins (CH)

(73) Assignee: Societe des Produits Nestle S.A., Vevey (CH)

( * ) Notice: Subject to any disclaimer, the term of this patent is extended or adjusted under 35 U.S.C. 154(b) by 218 days.

(21) Appl. No.: 16/212,110

(22) Filed: Dec. 6, 2018

(65) Prior Publication Data

US 2019/0191917 A1    Jun. 27, 2019

Related U.S. Application Data

(62) Division of application No. 15/106,420, filed as application No. PCT/EP2014/077194 on Dec. 10, 2014, now Pat. No. 10,165,891.

(30) Foreign Application Priority Data

Dec. 20, 2013  (EP) .................................... 13198958

(51) Int. Cl.
   *A47J 31/40*    (2006.01)
(52) U.S. Cl.
   CPC .................... *A47J 31/401* (2013.01)
(58) Field of Classification Search
   CPC .......... A47J 31/401; A47J 31/44; A47J 31/40; A47J 31/4403; A47J 31/404; A47J 31/46; A47J 31/003; A47J 31/402; A47J 31/405; B67D 5/56; B67D 1/08; B67D 5/06; B01F 7/04
   See application file for complete search history.

(56) References Cited

U.S. PATENT DOCUMENTS

| 5,918,768 A | 7/1999 | Ford |
| 2011/0121017 A1 | 5/2011 | Bergdahl et al. |

FOREIGN PATENT DOCUMENTS

| EP | 2085002 | 8/2009 |
| GB | 1004814 | 9/1965 |
| GB | 1006191 | 9/1965 |
| WO | 2013014142 | 1/2013 |

*Primary Examiner* — Hong T Yoo
(74) *Attorney, Agent, or Firm* — K&L Gates LLP

(57) ABSTRACT

A beverage preparation assembly includes: a container for storing a water soluble beverage powder, the container having a tank and a powder outlet; a dissolution chamber for preparing a beverage from the water soluble beverage powder and a diluent, the dissolution chamber having at last one diluent inlet and a beverage outlet; a chute for guiding the water soluble beverage powder from the powder outlet of the container to the dissolution chamber; and an air outlet configured for evacuating air from the dissolution chamber. The powder outlet is connected to the chute by a conduit; and the powder outlet, the conduit, the chute and the dissolution chamber are connected together through airtight connections. The assembly includes an air inlet positioned above the chute only.

11 Claims, 12 Drawing Sheets

BEVERAGE PREPARATION ASSEMBLY

PRIORITY CLAIM

This application is a divisional of U.S. application Ser. No. 15/106,420 filed Jun. 20, 2016, now U.S. Pat. No. 10,165,891 B2 which is a National Stage of International Application No. PCT/EP2014/077194 filed Dec. 10, 2014, which claims priority to European Application No. 13198958.4 filed Dec. 20, 2013, the entire contents of which are incorporated herein by reference.

FIELD OF THE INVENTION

The present invention relates to beverage dispensers preparing beverages from a soluble powder stored in a container and in which a dose of powder is dispensed from the container into a dissolution chamber to be mixed with a diluent.

BACKGROUND

Many beverages like espresso and other coffee beverages, milk beverages, chocolate beverages are prepared by mixing a food soluble powder with a diluent. Mixing devices are known for speedier preparation of such beverages by mixing the soluble food component with the diluent, such as water. These devices typically comprise a dissolution chamber in which the soluble component and the diluent are fed. The diluent can be introduced into the dissolution chamber in order to create a whirlpool to efficiently dissolve the soluble component in the hot water or the hot diluent can be introduced under the form of jets that provides mixing, dissolving and frothing. The mixture can also eventually be frothed by a whipper in the dissolution chamber to reconstitute the beverage and produce foam. The beverage is then usually evacuated into a receptacle for drinking.

The food soluble powder is usually stored in a container placed above the dissolution chamber opened mouth and a dosing device like a screw or an auger doses and delivers the food soluble powder which falls in the dissolution chamber. The dose is guided to the dissolution chamber opening by a chute that is attached to the container outlet or to the top of the dissolution chamber. Liquid is simultaneously fed to the dissolution chamber so that dissolution occurs. Several issues exist with such a configuration.

First the soluble powder frequently comprises fine particles which can easily flies when powder falls from the container through the chute to the dissolution chamber (volcano effect). These particles dirty the internal housing of the dispenser.

Secondly, due to the fact that the guiding chute emerges above the dissolution chamber then vapour and humidity generated during the beverage preparation in the dissolution chamber raises and enters the chute. If another beverage is rapidly prepared after another one then the new dose of powder delivered by the chute reacts partially with the humidity in the chute and creates non hygienic deposits in the chute. Vapour and humidity can even rise up to the outlet of the powder container and moisten its outlet or the outlet of the dosing device. After a period of time, this process can lead to an accumulation of moisture on the discharge port. As the quantity of soluble powder accumulating on discharge port increases over time, the outlet and/or the chute become increasingly constricted. Ultimately, this can result in the outlet becoming completely clogged, which results in the complete failure of the dosing device. Additionally, the soluble powder adhering to the discharge port is constantly moistened by the rising vapours. This can result in the soluble powder caking and even turning mouldy or growing harmful bacteria after extended use. This may lead to the dosing device rendering the powder ingredient inconsumable. This problem is generally solved by blowing or sucking air at the chute to deviate vapours as described in the following publications.

EP 2 085 002 proposes to close the top of the dissolution chamber with a cover during the beverage preparation and sucks vapour with a fan.

U.S. Pat. No. 4,245,680 proposes to blow hot air in the area of the powder delivery structure in order to create a warm air shroud which protects the structure from moisture.

U.S. Pat. No. 4,458,829 prevents the incursion of moisture into storage containers and prevent caking or hardening of the powders due to moisture absorption by having warm air circulation.

U.S. Pat. No. 5,839,610 describes the sucking of moisture and ingredient laden air from the top of the mixing bowl by an air fan.

U.S. Pat. No. 7,398,725 describes the use of an air current that transports the ingredient dose and prevents the rising steam from reaching the dosing device.

Current dispensers usually implement an extraction duct connected to a ring cap positioned at the top of the dissolution chamber as illustrated in U.S. Pat. No. 5,918,768. A fan sucks air from the end of the extraction duct.

Yet it has been observed that the proposed solutions are not sufficient and that current dispensers do still present cleaning issues and the internal parts of the dispenser must be regularly cleaned. In particular it has been noticed that powder fines systematically escape inside the machine housing. Due the presence of these fines the internal parts of the dispenser rapidly look dusty and dirty. The cleaning of these fines is difficult because they can be present in innermost recess and it is difficult to eliminate them.

Cleaning is a time consuming task because the dissolution chamber and the chute must be dismantled, cleaned and then reassembled. Moreover the cleaning must be done by people that have been trained for the disassembling and the reassembling to avoid errors and further failure in the beverages production. Usually this cleaning is made by an operator dedicated to the maintenance of the beverages production machines. Now there is need for decreasing the time for the cleaning operation to limit the period of time during which the dispenser is not operable. Moreover as people operating the dispensers are less and less trained there is a need for a dispenser that does not have to been cleaned on a daily basis.

In order to avoid that powder fines enter inside hydraulic and electric devices the housing of beverage dispenser has been split between a back proper area for these devices and a front less proper area by means of a separation wall. But this solution does not solve the problem of dirtiness in the front area.

An object of the invention is to address at least some of the drawbacks of the prior art beverage dispensers or at least to provide an alternative thereto.

It would be advantageous to provide a beverage dispenser that does not get dirty rapidly.

It would be advantageous to provide a beverage dispenser in which the frequency of manual cleaning operation can be reduced.

It would be advantageous to provide a beverage dispenser in which the extraction of humidity generated during beverage preparation is optimally controlled.

SUMMARY

According to a first aspect, there is provided a beverage preparation assembly comprising:

a container for storing a water soluble beverage powder, said container comprising a tank and a powder outlet, a dissolution chamber for preparing a beverage from the water soluble beverage powder and a diluent, said dissolution chamber comprising at last one diluent inlet and a beverage outlet, a chute for guiding the water soluble beverage powder from the powder outlet of the container to the dissolution chamber, an air outlet configured for evacuating air from the dissolution chamber, wherein the powder outlet is connected to the chute by a conduit, and wherein the powder outlet, the conduit, the chute and the dissolution chamber are connected together through airtight connections, and wherein said assembly comprises an air inlet, said air inlet being positioned above the chute only.

The beverage preparation assembly of the present invention is conceived for preparing a beverage from a water soluble beverage powder and a diluent in particular by mixing a dose of said powder with a diluent, preferably water. During mixing the powder dissolves in water and the mixture produces the beverage.

The assembly comprises a container for storing a water soluble beverage powder, said container comprising a tank and a powder outlet. Usually the powder outlet is positioned at the bottom of the tank. Preferably the assembly comprises a dosing device for dosing the water soluble beverage powder and delivering the dosed powder to the dissolution chamber through a container outlet. The dosing device is preferably a rotatable volumetric dosing member. The devices for dosing can be comprised in the list of a dosing screw, a dosing auger or perforated discs. Depending on the type of container the dosing device can be integrated inside the container or provided at the outlet of the container. According to the preferred embodiment the dosing device is placed inside the container and positioned at the bottom of the container. It is preferably a spring or screw auger. Such augers displace a volume of powder from the container to the powder outlet. This sub-assembly composed of the container and the dosing device is usually identified as a canister in current beverage dispensers.

The assembly of the present invention comprises a dissolution chamber for preparing a beverage from the water soluble beverage powder and a diluent, said dissolution chamber comprising at last one diluent inlet and a beverage outlet. The dissolution chamber is usually designed so as to make an efficient contact of the soluble powder and the diluent and improve the dissolution of the powder to produce the beverage.

The dissolution chamber can comprise at least one diluent inlet configured for introducing the diluent in the form of a jet inside the chamber. The chamber is preferably configured so that a whirlpool of liquid is created in the chamber and the jet of diluent hits said whirlpool. Such a dissolution chamber is described in WO 2008/071613. According to the preferred embodiment said dissolution chamber comprises two water inlets positioned at different heights in the chamber. Preferably the higher inlet is close to the top. Diluent introduced through the higher inlet is usually used to rinse the chamber after a beverage preparation or to prepare big sized beverages Alternatively the dissolution chamber can comprise a bowl and a whipper. The whipper is actuated by a motor to mix and usually froth the mixture of powder and diluent.

Usually the dissolution chamber is positioned under the powder outlet of the container so that the powder can be delivered from the container in the chamber by gravity fall.

Generally the top of the dissolution chamber is opened so that powder can freely flow inside by gravity fall. By opened it is meant that the top of the chamber is not covered e.g. by a lid.

The diluent inlet is connected to a diluent supply. The diluent is generally water. The diluent supply generally comprises a diluent tank, a pump, a diluent heater and/or a diluent cooler and valves to deliver the requested diluent in the chamber.

The assembly of the present invention comprises a chute for guiding the water soluble beverage powder falling from the powder outlet of the container to the dissolution chamber. Generally the chute presents a cylindrical shape and preferably a conical shape tapering from the top to the bottom of the chute.

The assembly comprises an air outlet configured for evacuating air from the dissolution chamber. The air outlet is generally a simple hole, tube or conduit connected to an air sucking device, usually a fan. It is generally positioned above or near to the top of the dissolution chamber. According to an embodiment the assembly can comprise more than one air outlet.

According to the invention the powder outlet is connected to the chute by a conduit. Consequently, contrary to the current embodiments of the state of the art the powder flow path between the powder outlet and the chute is not opened to atmosphere. Said conduit acts as a shield that prevents powder from flowing inside the dispenser housing during its delivery to the dissolution chamber. Said conduit also participates in protecting the powder outlet from humidity created in the dissolution chamber as explained hereunder.

According to the invention the powder outlet, the conduit, the chute and the dissolution chamber are connected together through airtight connections. So the assembly of these different elements forms an airtight closed assembly. A closed space is created around the powder flow path from the powder outlet down to the dissolution chamber.

According to the invention the beverage preparation assembly comprises an air inlet, said air inlet being positioned above the chute only. The air inlet is generally a simple hole opened to the outside of the assembly. The hole can be protected by a grid or several holes can be present forming a grid. According to the invention the air inlet is above the chute only. So no air inlet is present under the chute.

The assembly is configured for being airtight between the inside and the outside of the assembly except at the air inlet and the air outlet specifically designed for controlling the flow of air in the assembly. Each elements of the assembly are assembled together in order to avoid air leaking except at the designed air outlet and air inlet so that the air flow path is controlled.

The assembly enables a total control of the air flow inside in terms of direction and stability. The air flow is always in the same direction in each part of the assembly and there is no decrease in air velocity over time that could create a leak in the system.

In general the airtightness is relative and some small leaks can be accepted at the connections between the different pieces of the elements of the assembly as far as they do not disturb the general flow path of air in the assembly. For example connections like screwing, snap fitting, sliding between conformal shapes, bayonet type connection, connection with corresponding pins and holes in respective pieces are generally sufficient to provide air tight connection and enable the control of the air flow inside the assembly.

Preferably the different parts of the assembly can be dismantled one from the other for cleaning. Therefore the assembly preferably presents removable connections. Removable connections can exist at least:

between the dissolution chamber and the chute, and
between the conduit and the powder outlet.

Preferably the first extremity of the conduit is connected to the powder outlet of the container and the second extremity of the conduit is connected to the top of the chute.

Preferably the first extremity of the conduit is horizontally oriented so as to engage the container powder outlet. According to this embodiment the conduit usually presents a bent so that its second extremity is essentially vertical. According to the preferred embodiment the container powder outlet and the first extremity of the conduit presents conformal shapes so that one can engage the other to create a connection. Preferably the first extremity of the conduit surrounds the container powder outlet. The connection can be established by sliding the first extremity of the conduit around the powder outlet.

Preferably in the assembly an annular wall surrounds the bottom wall of the chute and defines:

a first internal annular space between said annular wall and the bottom wall of the chute and
a second external annular space between said annular wall and the top wall of the chamber, the first internal annular space being connected to the air outlet configured for evacuating air from the dissolution chamber.

Preferably the chute and the conduit are made of one single piece of material. In this embodiment the bottom of the conduit forms the chute. The dissolution chamber and the container powder outlet can be connected to and dismantled from said single piece of material.

In this preferred embodiment, preferably the air outlet is part of said single piece of material.

Preferably said single piece of material comprises connecting means configured for fitting with corresponding connecting means at the top of the dissolution chamber. Said connecting means preferably guarantees air tight connection. The connecting means can be threaded screw connection, bayonet type connection, corresponding pins and holes in respective two pieces or any other type of means for connecting two pieces.

Preferably said single piece of material comprises connecting means configured for fitting with corresponding connecting means at the powder outlet of the container. Said connecting means preferably guarantees air tight connection. The connecting means can simply be conformal shapes as already described hereabove.

Preferably said single piece of material comprises connecting means configured for fitting with an air extraction duct. Preferably the fitting guarantees air tight connection. Again the connecting means can simply be conformal shapes as already described hereabove.

The air tight connection can be reinforced by using gasket. Yet simple connection like screwing and bayonet can be sufficient.

Preferably if the assembly comprises an annular ring such as described hereabove then the single piece of material comprises said annular ring.

Preferably the powder outlet of the container for storing a water soluble beverage powder comprises a discharge port that is configured for being closed during the preparation of a beverage in the dissolution chamber.

Preferably the discharge port of the container for storing a water soluble beverage powder comprises:

an internal delivery tube comprising a hollowing-out in its bottom part,
an external movable cover comprising a hollowing-out in its bottom part, said external movable cover covering at least a part of the internal delivery tube and being movable between:
a dosing position in which the both hollowing-outs of the internal delivery tube and of the external movable cover overlap each other, and
a rest position in which the surface of the external movable cover overlaps and closes the hollowing-out of the delivery tube.

Generally the internal delivery tube of the discharge port is fixed. Generally it is attached to the outlet of the container tank. According to an embodiment it can be part of the outlet of the container tank. It usually presents the shape of a cylinder. The base at the end of the internal delivery tube is closed near the outlet extremity so that the beverage powder dose displaced by the dosing device can be evacuated by the hollowing out only. Preferably the hollowing out is next to the end of the tube. According to an embodiment, the internal delivery tube can comprise a partial weir, preferably a half moon weir, obstructing the lower part of the tube in front of its hollowing-out.

The discharge port also comprises an external movable cover. By external it is meant that this tube surrounds the internal delivery tube delivering the powder form the container tank. This external cover also comprises a hollowing out in its bottom part. This external cover is movable so that, according to its position, its hollowing out can overlap or not the hollowing out of the delivery tube and consequently enables the opening or the closing of the discharge port for delivering powder.

Preferably the external movable cover comprises at least one opening at its end covering the end of the internal delivery tube next to the hollowing out. This opening avoids that some powder or fines remain trapped between the ends of the tube and the cover during the movement of the movable cover. Powder or fines can escape from the movable cover through the opening.

Preferably the external movable cover moves according to a translation movement. The translation movement is preferably along the axial direction of the internal delivery tube. This direction is usually the direction of the axis of the spring auger.

Preferably the assembly comprises an actuator able to exert a force on the external movable cover so as to push said cover away from hollowing-out of the internal delivery tube. So powder can be delivered.

According to said embodiment comprising such a discharge port, the conduit of the assembly connected to the powder outlet is configured so as to provide a space for the movement of the external movable cover. Preferably said space is configured so that during the delivering of the powder the external movable cover at least partially blocks the path for air between the air inlet and the bottom of the chute.

Due to the air tight connection of the different elements making up the assembly, the way air enters in the assembly, circulates in the assembly and flows out of the assembly can be controlled. In particular air can be sucked at the air outlet to create a unidirectional flow F of air from the air inlet through the bottom section S2 of the chute. By "unidirectional" it is meant that air flows only according to one direction through that section. According to the normal sense of use of the assembly it means that usually said direction is the vertical direction from the top of the chute down to the bottom of the chute. It is also preferable that through the bottom section S2 of the chute the air flow is homogeneously distributed. By "homogeneously" it is meant that the air presents essentially the same velocity through that whole section.

Preferably sucked air creates that unidirectional air flow presenting a velocity V2 that is sufficient to create a screen for mist present in the dissolution chamber—that is to prevent mist from crossing the bottom section S2 of the chute. Said mist is composed of vapor, steam, small liquid drops that are able to naturally rise by convection during beverage preparation or chamber cleaning. The implementation of the above controlled air flow enables the presence of mist under the chute bottom only. Consequently no humidity can cross the frontier created by the air flow through the chute bottom.

Based on a defined chute bottom section S2 a unidirectional air velocity V2 can be reached by sucking air at flow rate Q at the air outlet. The adequate flow rate Q guarantees that a sufficient air velocity is reached to create a screen for mist. Preferably V2 is greater than 0.05 m/s corresponding to the mist convection velocity.

The design of the internal geometry of the assembly can also be designed to optimize the circulation of air flow inside the assembly.

Generally section S2 is defined so that a dose of powder falling from the powder outlet does not deposit on the chute upper surface. Based on a defined section S2 of the bottom chute the control of flow rate Q at the air outlet is a parameter enabling the above control. Other parameters can be defined to optimally reach the objective of the control of the air flow through the chute bottom section, in particular: the distance between the air inlet and the chute bottom and the geometry of the ring.

Preferably the section S3 of the air outlet can be defined so that water present in the dissolution chamber is not sucked through the air outlet. Indeed if said section S3 is too small, then the local air flow velocity at the air outlet can be such that liquid droplets are sucked from the chamber during beverage preparation or rinsing.

Preferably the section S1 of the air inlet is defined so as to avoid air pressure loss. Indeed if said section S1 is too small, then the pressure drop at the air inlet can be such that the fan must fight against said high pressure drop to achieve the required flow rate Q. This means that a very powerful fan is required to get said required flow rate Q; this fan can be oversized for a beverage dispenser. Moreover a too small section S1 usually creates noise due to the high local velocity.

According to a particular embodiment the invention concerns a beverage preparation assembly wherein the bottom section S2 of the chute can present a section comprised between 2 and 20 $cm^2$ and a sucked air flow rate Q comprised between $10^{-5}$ and $10^{-3}$ $m^3/s$ at the air outlet so as to get a velocity V2 at the chute bottom comprised between 0.05 and 0.5 m/s.

According to this particular embodiment:
the distance between the air inlet and the bottom section S2 of the chute can be comprised between 5 and 15 cm.
the section S3 of the air outlet presents a section comprised between 2 and 8 $cm^2$.

the section S1 of the air inlet (or all the air inlets if there are several) presents a section comprised between 2 and 8 $cm^2$.

Depending on the geometry of the assembly the above figures can be adapted in order to get the unidirectional air flow path such as described hereabove.

According to a second aspect there is provided a beverage dispenser comprising at least one beverage preparation assembly such as described hereabove.

In the beverage dispenser the air outlet of the at least one beverage preparation assembly is connected to an extraction duct and a fan is present in the extraction duct.

Preferably the beverage dispenser comprises several beverage preparation assemblies wherein each beverage preparation assembly is dedicated to the preparation of a particular beverage. The beverage dispenser can comprise at least one beverage preparation assembly dedicated to the preparation of a coffee beverage, at least one beverage preparation assembly dedicated to the preparation of a milk beverage and at least one beverage preparation assembly dedicated to the preparation of a chocolate beverage.

Each beverage assembly forms a column dedicated to the preparation of one type of beverage from the beverage powder storage down to the corresponding beverage dispensing area and avoids cross-contamination between each column.

Generally the air outlet of each beverage preparation assembly can be connected to the same extraction duct and the same fan. According to a particular mode each air outlet of each beverage preparation assembly can be connected to a dedicated extraction duct and a dedicated fan. Such a mode enables a better control of the air flow in each assembly.

Apart from the beverage preparation assembly the beverage dispenser generally comprises:
a housing,
a fluid system for delivering a diluent to the at least one diluent inlet of the dissolution chamber,
a dispensing area,
a user interface.
The user interface enables the ordering of beverage.

The fluid system for delivering a diluent to the at least one diluent inlet of the dissolution chamber can comprise a heating device and/or a cooling device, a pump and generally valves to enable the dispensing of the diluent in the dissolution chamber.

The dispensing area enables the positioning of a receptacle to receive the produced beverage.

Usually the dispenser comprises at least one motor associated to the container of the beverage assembly to activate powder dosing.

Generally the dispenser comprises a control unit to command the activation of the different motors to produce a selected beverage.

According to a third aspect there is provided a process for the preparation of a beverage with a beverage preparation assembly such as described hereabove or a beverage dispenser such as described hereabove, wherein the following steps are implemented:
a)—a dose of beverage powder is dispensed from the powder outlet of the container and delivered to the dissolution chamber through the chute,
b)—a dose of diluent is delivered in the dissolution chamber and mixed with the dose of powder to produce a beverage,
c)—the produced beverage is delivered through the chamber outlet, wherein during the whole step b) air is sucked from the air outlet so that a unidirectional flow (F) of air is created from the air inlet down to the bottom of the chute.

In general air is sucked from the air inlet during the whole process. Air can be sucked essentially constantly even if no beverage is prepared. But air sucking can be switched off if the dispenser is in an energy saving mode. But preferably the flow rate at which the air is sucked is decreased during the step a) of dispensing a dose of beverage powder. This avoids that powder fines are sucked directly in the air outlet during that step.

Preferably the flow rate of air sucked from the air outlet is controlled so that the unidirectional flow F of air prevents mist from crossing the bottom section S2 of the chute.

Preferably the flow rate of air sucked from the air outlet is controlled so that the air velocity V2 through the bottom of the chute is of at least 0.05 m/s.

Depending on the value of the section S2 of the bottom of the chute, the air flow rate at the air outlet can be adjusted to reach the air velocity V2 at the bottom chute that is preferably above that value of 0.05 m/s. Actually the flow rate Q of air in the assembly and flowing through a section S inside the assembly is defined generally as Q=S×V with V velocity of air through that section. Consequently if an air flow rate Q is sucked by a sucking device like a fan at the air outlet of the assembly, then said flow Q is sucked through section S2 of the chute bottom due to the air tightness of the assembly. At this section said air flow Q is equal to the S2×V2 with V2, velocity of air through the chute bottom. The sucking device can be controlled to set the air flow rate Q to achieve a velocity V2 of at least 0.05 m/s at the chute bottom.

Generally air is sucked from the air outlet by a sucking device and the flow rate of air sucked from the air outlet is controlled by monitoring the power of the sucking device.

In the present application the terms "bottom", "upper", "top", "lateral", "above", "under, "lower", "horizontal", "superior, "external" and "vertical" are used to describe the relational positioning of features of the invention. These terms should be understood to refer to the elements of the beverage preparation assembly in their normal orientation when positioned in a beverage preparation machine for the production of a beverage as shown for example in FIGS. 1, 2, 5, 6 and 7.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION

The characteristics and advantages of the invention will be better understood in relation to the following figures in which.

DETAILED DESCRIPTION

Figure 1:
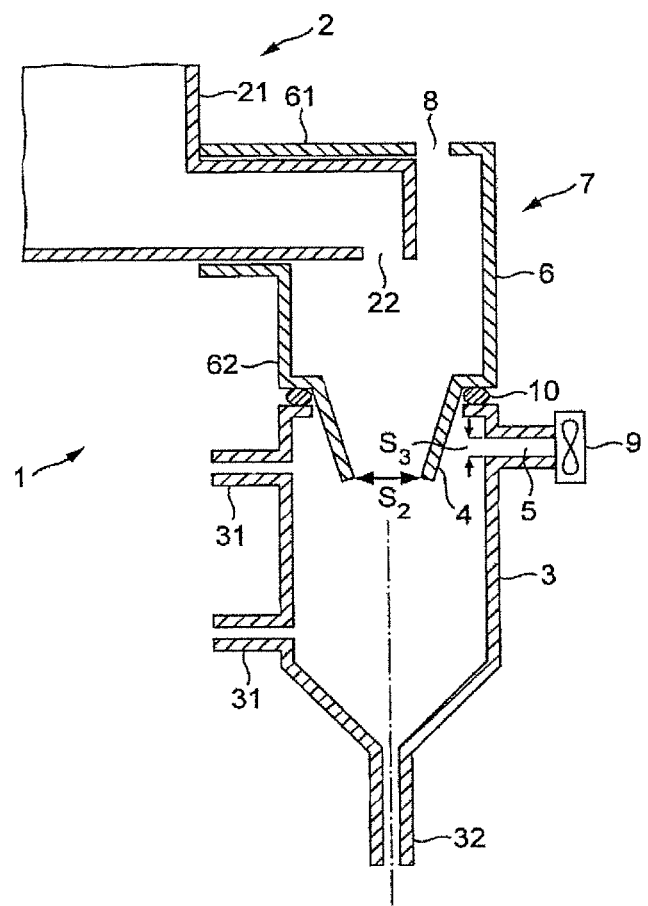
FIG. 1 is a schematic diagram of a beverage preparation assembly according to the present invention.

FIG. 1 illustrates a beverage preparation assembly 1 according to the invention. The assembly comprises a container 2 for storing a water soluble beverage powder. The container comprises a tank 21 and a powder outlet 22. The container 2 usually comprises a dosing device for dosing and moving a dose of powder through the outlet 22. This device is not represented in FIG. 1.

The beverage preparation assembly 1 comprises a dissolution chamber 3 positioned under the powder outlet 22. This chamber 3 is configured for preparing a beverage from the water soluble beverage powder and a diluent. In FIG. 1 the dissolution chamber comprises two diluent inlets 31 and a beverage outlet 32. The diluent inlets are connected to a diluent supply. The diluent is usually water. The chamber presents an opened top 33 through which the dose of powder dispensed from the container outlet 22 can flow. In FIG. 1 the illustrated chamber is deprived of any mechanical device activated by a motor for improving dissolution.

Figure 7:
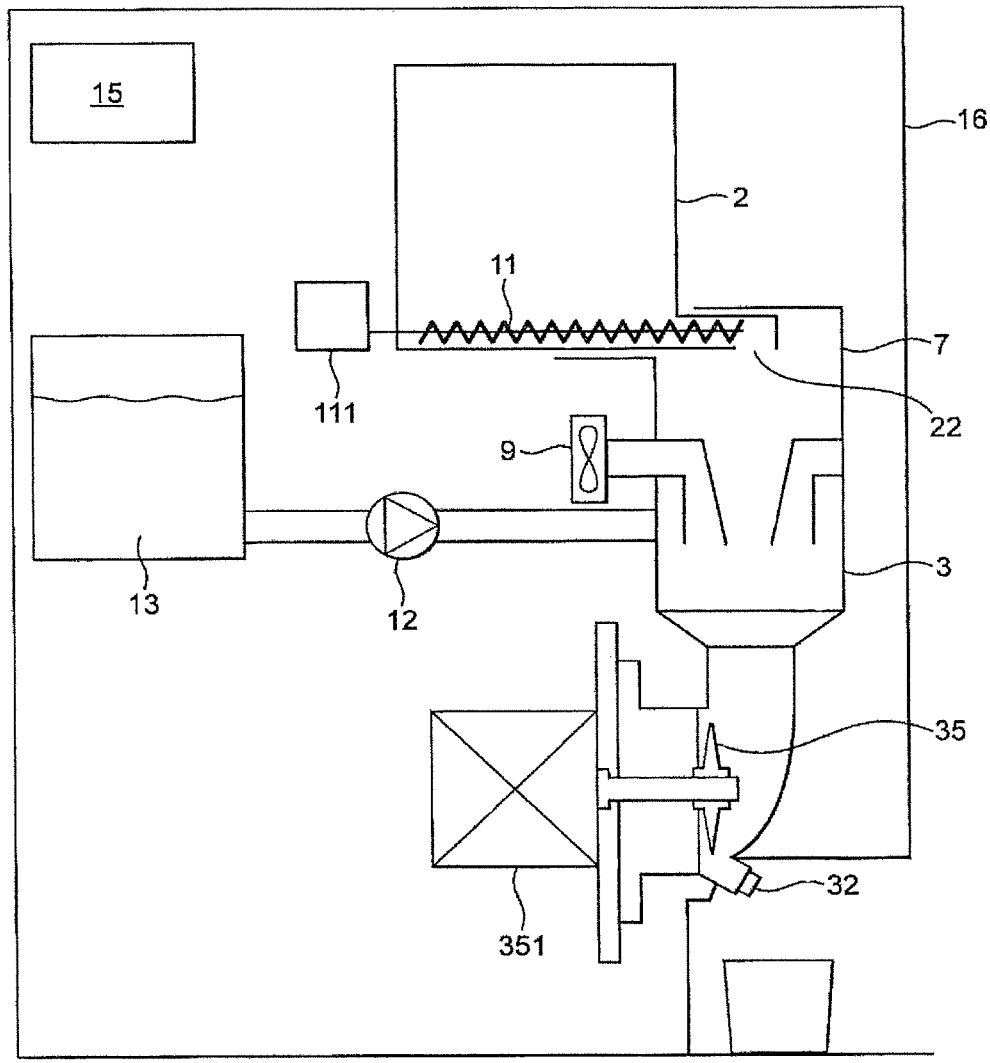
FIG. 7 is a schematic view of a beverage dispenser comprising at least one beverage preparation assembly according to the invention.

The dissolution is obtained by the contact of the diluent with the powder. Such a chamber can configured as described in WO 2008/071613. Yet the invention can also be implemented with a dissolution chamber comprising a whipper actuated by a motor (as illustrated in FIG. 7).

The assembly 1 comprises an air outlet 5 configured for evacuating air from the dissolution chamber 3. This air outlet 5 is positioned near to the top of the dissolution chamber. This air outlet is connected to a sucking device, preferably a fan, usually through a conduit. In general the conduit comprises a filter to avoid that humidity and fines enter in the sucking device.

The assembly 1 comprises a chute 4 for guiding the water soluble beverage powder from the powder outlet 22 of the container to the dissolution chamber 3. The chute is connected to the top of the dissolution chamber and this connection is airtight and watertight for example by means of a gasket 10 placed between the lateral edge of the chute and the top of the chamber. Preferably the chute is connected to the chamber so that the upper diluent inlet 31 and and the air outlet 5 are positioned in the annular space formed between the chute 4 and the lateral upper wall of the chamber.

In the assembly 1 the powder outlet 22 is connected to the chute 4 by a conduit 6. The powder outlet 22, the conduit 6, the chute 4 and the chamber are connected together through airtight connections. Said air tight connections can be obtained with the conduit 6 forming tight connections at its both extremities with the other elements of the assembly. In FIG. 1 the first extremity 61 of the conduit connects to the powder outlet 22 and engages said powder outlet by surrounding it. This first extremity of the conduit 61 is horizontally oriented so as to surround the particular illustrated powder outlet of FIG. 1 and the conduit 6 presents a bent so that its second extremity 62 is vertically oriented, yet other configuration of the conduit can be implemented depending on the orientation and shape of the powder outlet. The second extremity 62 of the conduit is connected to the top 41 of the chute. In FIG. 1 the bottom of the conduit 6 forms the chute 4 and these both elements form one single piece of material 7. That guarantees a perfect air tight connection between these both elements. Yet according to the invention the conduit and the chute can be separated elements too, these elements being connected together through an airtight connection.

The single piece of material 7 integrating the conduit 6 and the chute 4 is connected to the top of the chamber in an airtight manner with a gasket 10 as described hereabove. Said gasket enables a watertight connection also in case a whirlpool of water would reach the top of the chamber.

Consequently the powder outlet 22, the conduit 6, the chute 4 and the dissolution chamber 3 form an airtight closed assembly. The assembly 1 defines a closed environment and a closed path for the powder flowing from the powder outlet to the dissolution chamber. The assembly 1 comprises one air inlet 8. This air inlet 8 is positioned above the chute 4 only. Due to the airtightness of the assembly around the path of the powder dose powder fines do not flow outside the dissolution chamber during dosing. Moreover the control of the air flow in said closed environment from the air inlet down to the chute bottom and through the air outlet enables the creation of a dry zone above the chute bottom and a wet zone under the chute bottom.

Preferably the bottom section S2 of the chute 4 is configured for being sufficiently large so that powder can easily flows through it without depositing on the chute. By controlling the flow of air sucked at a flow rate Q through the air outlet 5 a unidirectional flow F of air from the air inlet 6 through the bottom section S2 of the chute is created. It means that air flows only according to one direction through that section that is from the top down to the chamber. Moreover said flow is preferably homogeneously distributed through the whole bottom section S2 of the chute.

Figure 8A:
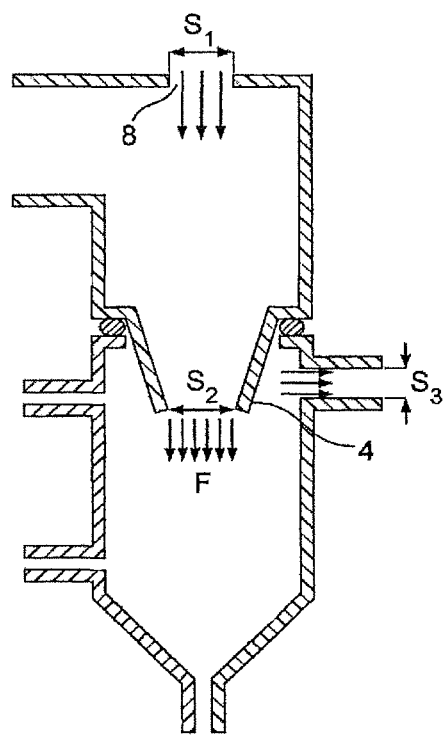
FIGS. 8A, 8B and 8C illustrate various distributions of flows in beverage preparation assemblies.
Figure 8B:
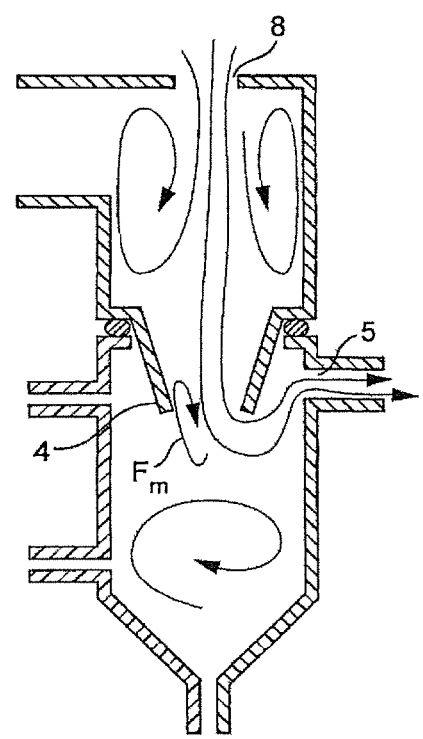

Based on the value of the section S2 and on the value of the flow rate Q sucked through the outlet 5 the unidirectional air flow flowing through the chute bottom 43 present a sufficient velocity V2 to create a screen to prevent mist of the dissolution chamber from crossing the bottom section S2 of the chute. This mist is usually composed of vapour, humid air, water droplets, water splashing and is naturally moved by convection from the chamber up to the chute. The velocity V2 of the air through the chute bottom is defined to be superior to the velocity of air moving through convection. The air flow through the chute bottom 43 creates a barrier to humidity generated in the chamber. As a consequence the upper part of the assembly above the bottom chute 43 always remains dry, so the superior face 44 of the chute on which powder fines may fall always remain dry. When powder is dosed the dose of powder slides on said superior dry face 44 of the chute and does not react with humidity in the chute leading to sticky deposits on the chute as in the chutes of the prior art. So the operator can rapidly clean said part of the chute when the assembly is disassembled for cleaning operation. FIG. 8A illustrates the creation of unidirectional flow F of air homogeneously distributed through the chute bottom. This flow creates a virtual frontier between an upper dry zone and a lower wet zone. On the contrary FIG. 8B illustrates the creation of a flow of air through the chute bottom that is not homogeneously distributed; for that reason a flow of mist Fm is able to flow upwardly in the chute. This default is due to a too big section of bottom chute S2.

Figure 8C:
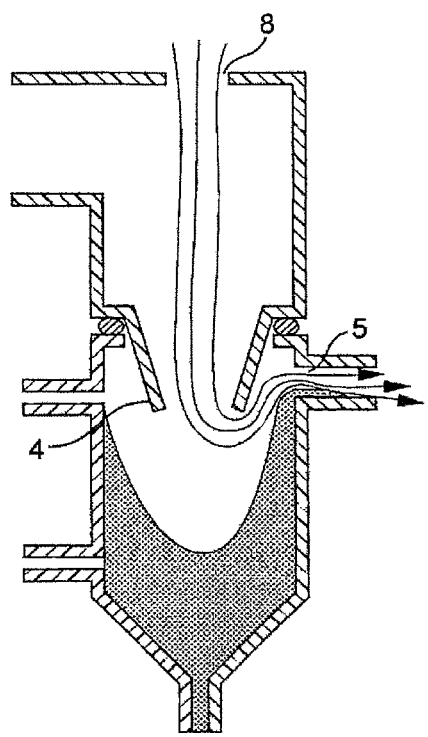

In the assembly 1 the section S3 of the air outlet 5 is preferably defined so that water present in the dissolution chamber cannot be sucked through the air outlet 5. In particular S3 shall not be too small, otherwise the pressure drop would be such that droplets of liquid would be sucked during beverage preparation or cleaning. FIG. 8C illustrates an embodiment where a too important air flow at the air outlet 5 sucks liquid in the outlet.

Similarly on the assembly 1 the section S1 of the air inlet 8 is preferably defined so as to avoid pressure loss. In particular S1 shall not be too small, otherwise the flow rate of air Q would need to be significant and the control of the air flow at the section S2 would be difficult to control.

In general, for a particular section S2 at the bottom of the chute the air flow rate Q is controlled so as to reach the objective of maintaining a unidirectional and preferably homogeneous flow of air through the section S2. Other parameters can be optimised:
  the distance between the air inlet 8 and the chute bottom,
  the section S1 of the air inlet,
  the section S3 of the air outlet,
  the presence and the geometry of the annular wall 41.

In order to prepare a beverage with beverage preparation assembly 1 a dose of beverage powder is dispensed from the powder outlet 22 of the container and delivered to the dissolution chamber 3 through the chute 4, then a dose of diluent is delivered in the dissolution chamber and mixed with the dose of powder to produce a beverage, and the produced beverage is delivered through the chamber outlet 32. During at least the whole powder and diluent mixing step air is sucked from the air outlet 5 so that:
  an unidirectional flow F of air is created from the air inlet 6 down to the bottom 43 of the chute, and
  the unidirectional flow F of air prevents any flow of mist produced from flowing up through the chute 4.

Preferably air is sucked also during the step of powder dosing. Eventually the flow rate at which the air is sucked can be decreased during said step of dispensing a dose of beverage powder. This decrease avoids that a too important flow of air sucks powder fines through the extraction duct.

Figure 2:
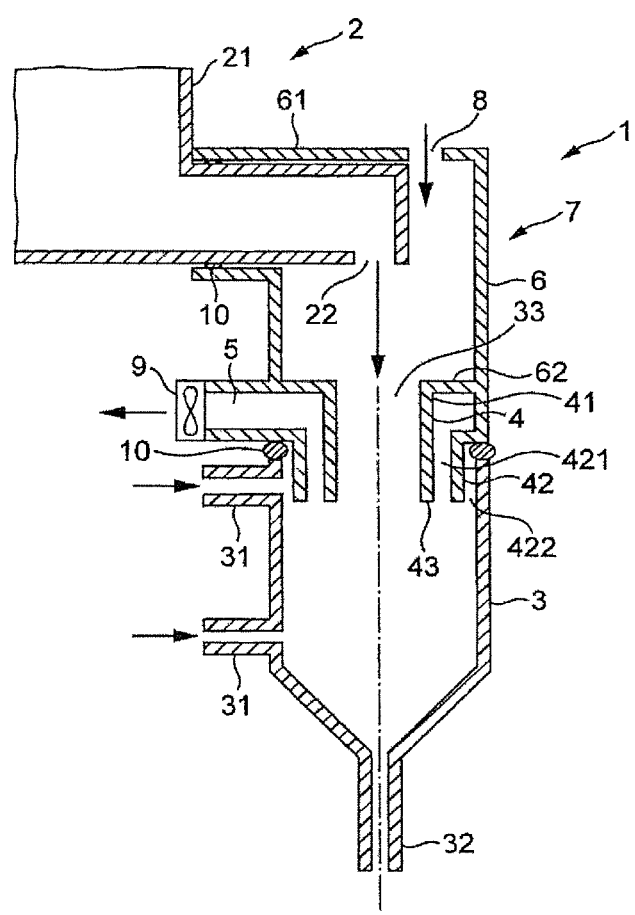
FIG. 2 is a schematic diagram of another beverage preparation assembly according to the present invention.

FIG. 2 illustrates a beverage preparation assembly such as described in FIG. 1 except that the chute 4, the conduit 6 and the air outlet 5 are part of one single piece of material 7. The water and airtight connection with the powder outlet 22 and the dissolution chamber 3 is obtained with gaskets 10. In FIG. 2 the assembly comprises an annular wall 42 that surrounds the bottom wall 43 of the chute. This annular wall defines two annular spaces:
  a first internal annular space 421 between said annular wall 42 and the bottom wall 43 of the chute, and
  a second external annular space 422 between said annular wall 42 and the top wall 34 of the chamber.

The bottoms of the both spaces 421, 422 are opened above the dissolution chamber 3.

The top of first internal annular space 421 is connected to the air outlet 5 configured for evacuating air from the dissolution chamber. So the annular wall 42 forms a conduit for sucking air from the chamber to the air outlet. The geometry of the first internal annular space 421 can be optimised in order to improve the control of the air flow through the system and in particular near the air outlet if necessary.

The annular wall also prevents water from diluent inlet 31 to be partially sucked because it creates a partition wall.

Figure 3A:
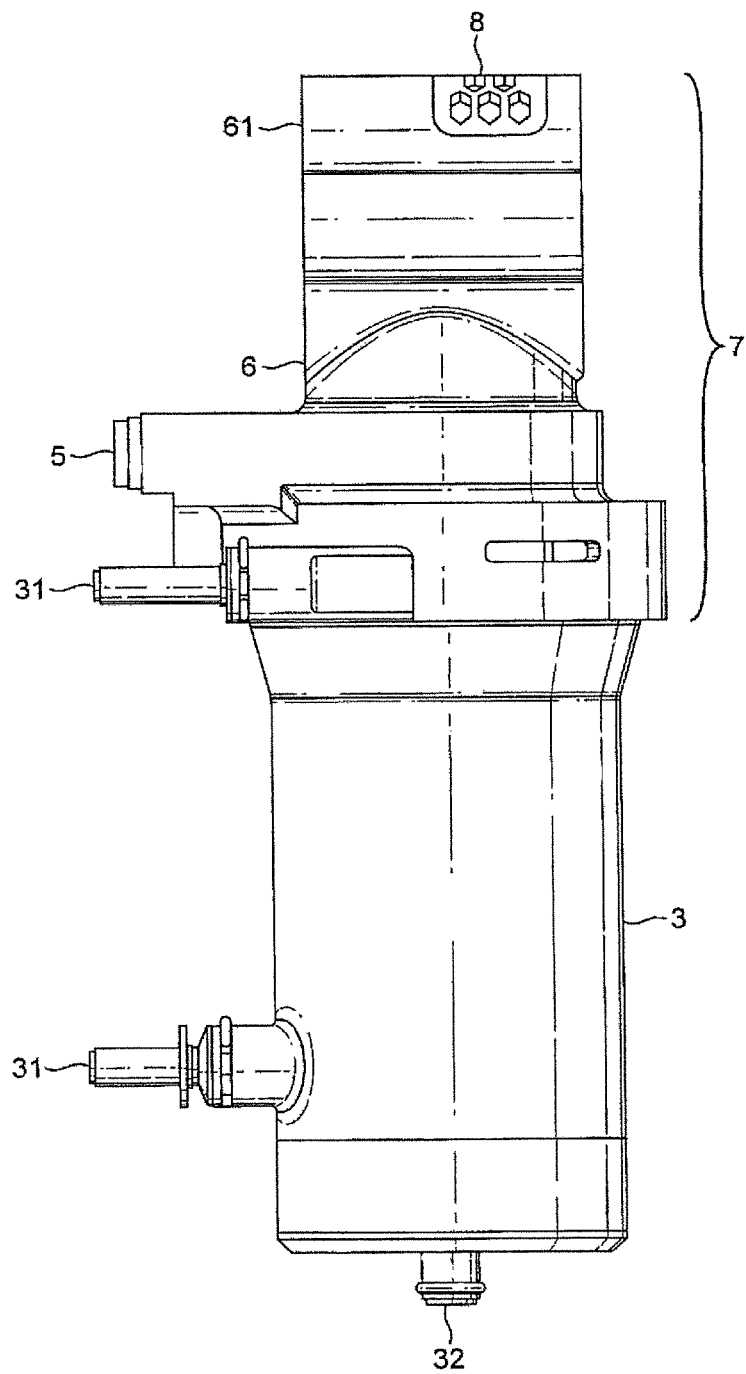
FIGS. 3A and 3B are respective side and perspective views of an example of single piece of material associated to the dissolution chamber as schematically illustrated in FIG. 2.
Figure 3B:
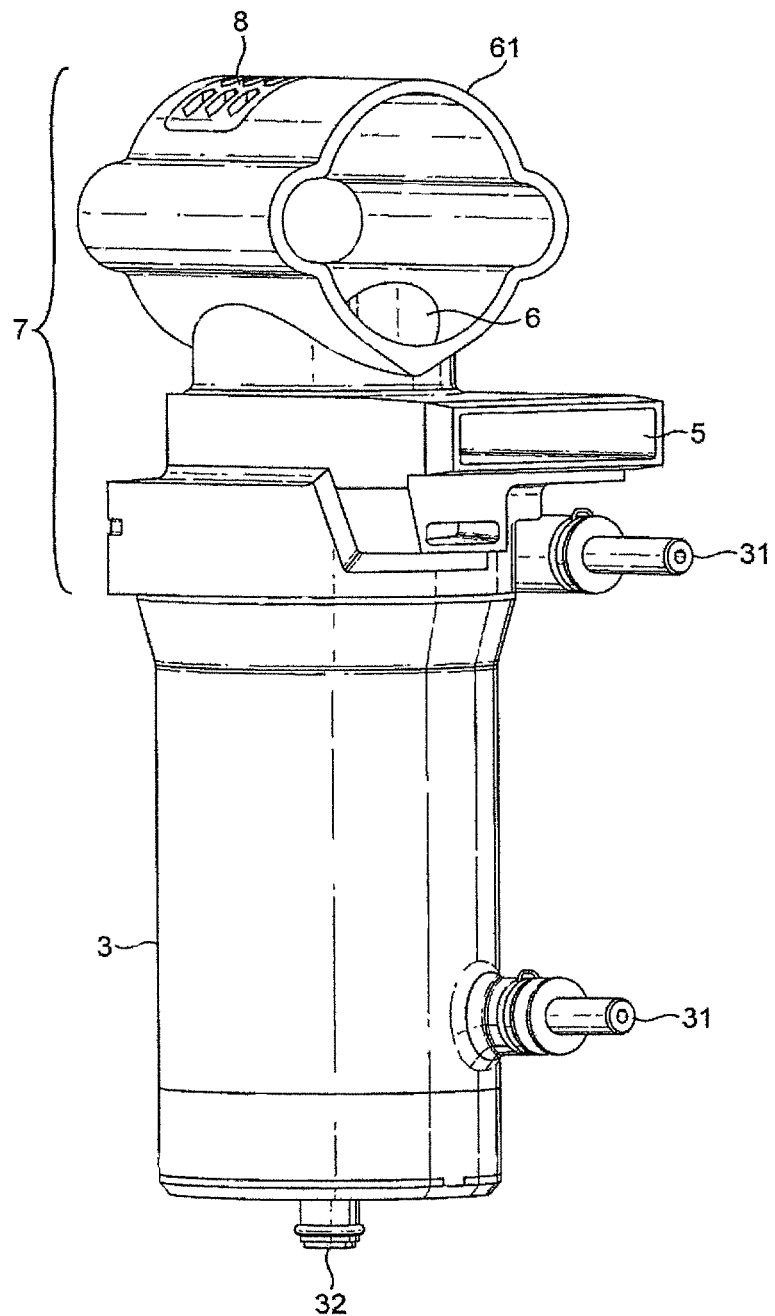

FIGS. 3A and 3B are respective side and perspective views of an example of single piece of material 7 associated to the dissolution chamber 3 as schematically illustrated in FIG. 2. The air inlet 8 is protected by a grid. Such a grid can avoid that insects or small pieces fall inside when the dispenser housing is opened.

Figure 4A:
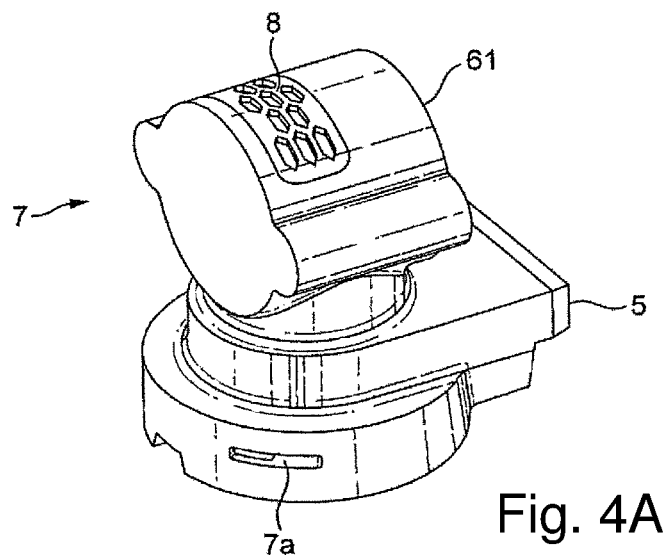
FIG. 4A is a perspective view of the single piece of material of FIGS. 3A and 3B.
Figure 4B:
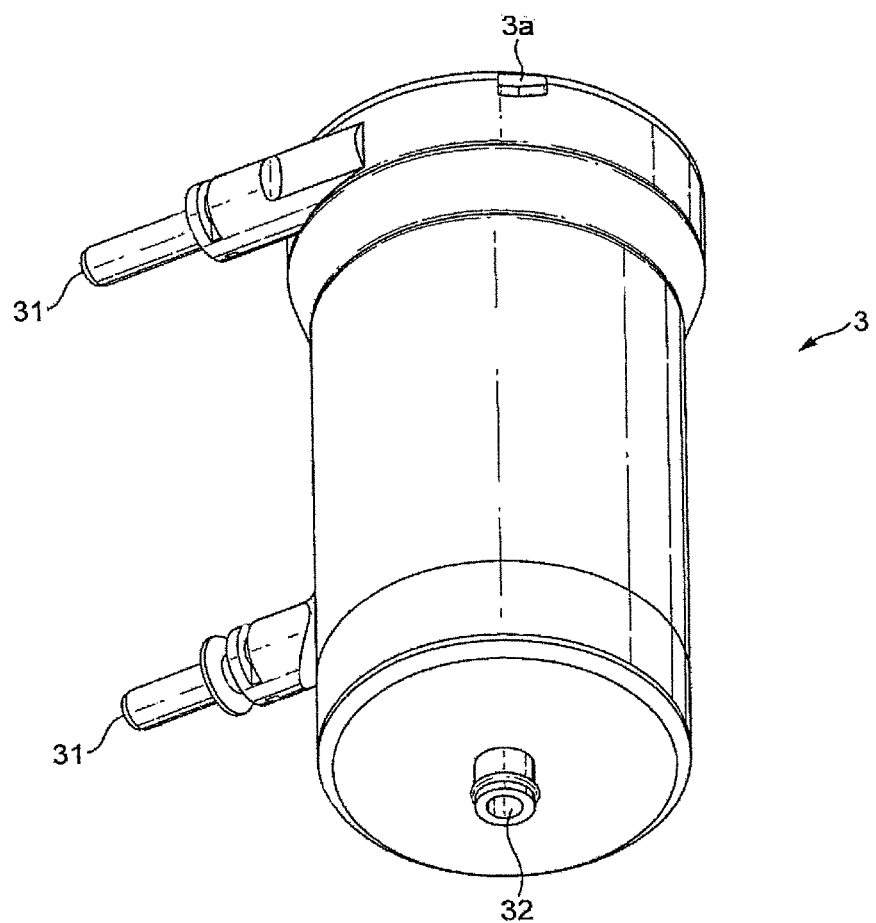
FIG. 4B is a perspective view of the dissolution chamber of FIGS. 3A and 3B.

FIGS. 4A and 4B are perspective views of each of the single piece of material 7 and the dissolution chamber 3 of FIGS. 3A and 3B. The single piece of material 7 comprises connecting means 7a configured for fitting with corresponding connecting means 3a at the top of the dissolution chamber 3. In the illustrated embodiment the single piece of material 7 presents a slot 7a in its internal surface in which a pin 3a at the top of the dissolution chamber can slide.

Figure 4C:
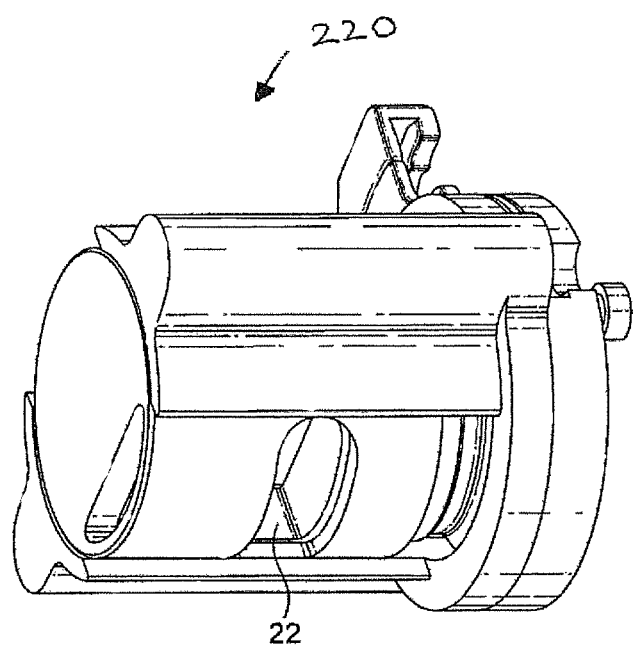
FIG. 4C is a perspective view of a container powder outlet.

FIG. 4C is a perspective view of the discharge port 220. The external shape of the discharge port is designed so that the extremity 61 of the single piece of material 7 can slide around the discharge port. The external shape of the discharge port 220 and the internal shape of the extremity 61 of the single piece of material 7 are conformal.

Similarly the internal shape of the extremity 61 of the air outlet 5 and the external shape of the conduit to the air sucking device 9 can present conformal shapes so that they can be plugged one into another.

Generally all the connections are made through air tight connecting means.

The connections are also configured to enable easy dismantling for the operator.

Figure 5:
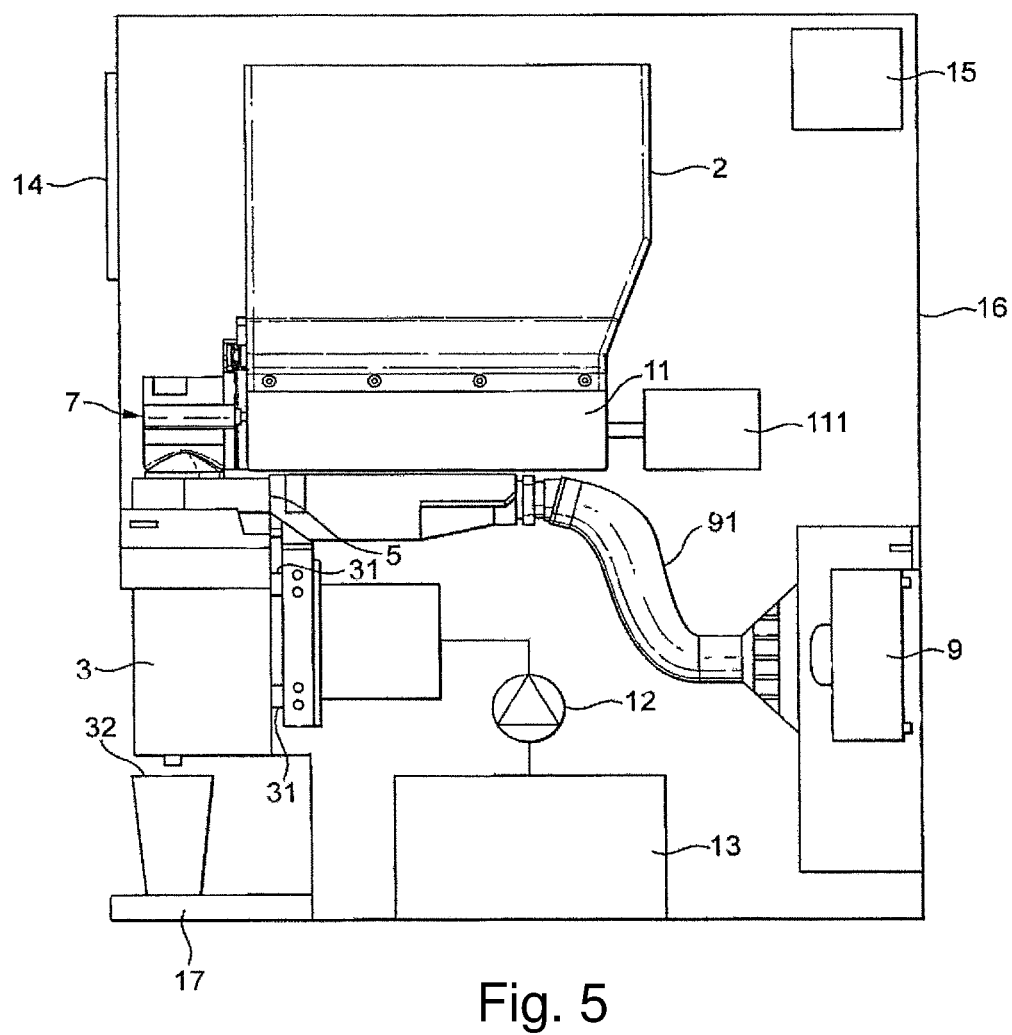
FIG. 5 is a schematic view of a beverage dispenser comprising at least one beverage preparation assembly according to the invention.

FIG. 5 illustrates a beverage dispenser comprising an assembly such as described hereabove. In the dispenser it is made apparent that the diluent inlets 31 of the beverage dispenser are connected to a supply of water that is preferably a boiler 13. The dispenser comprises a pump 12 to pump water from the boiler. The dissolution chamber 3 delivers the prepared beverage through its outlet 32 in a drinking cup that can be positioned in a dispensing area 17. A powder dosing device 11 at the bottom of the powder container 2 is actuated by a motor 111 to deliver a powder dose in the dissolution chamber. A fan 9 is connected through an extraction duct 91 to the air outlet 5. A user interface 14 enables a customer to select and launch a beverage preparation. A control unit 15 is linked to the user interface and the different motors to prepare the ordered beverage. All the different devices are housed in a housing 16. The above devices are current in the field of beverage dispensers.

Figure 6:
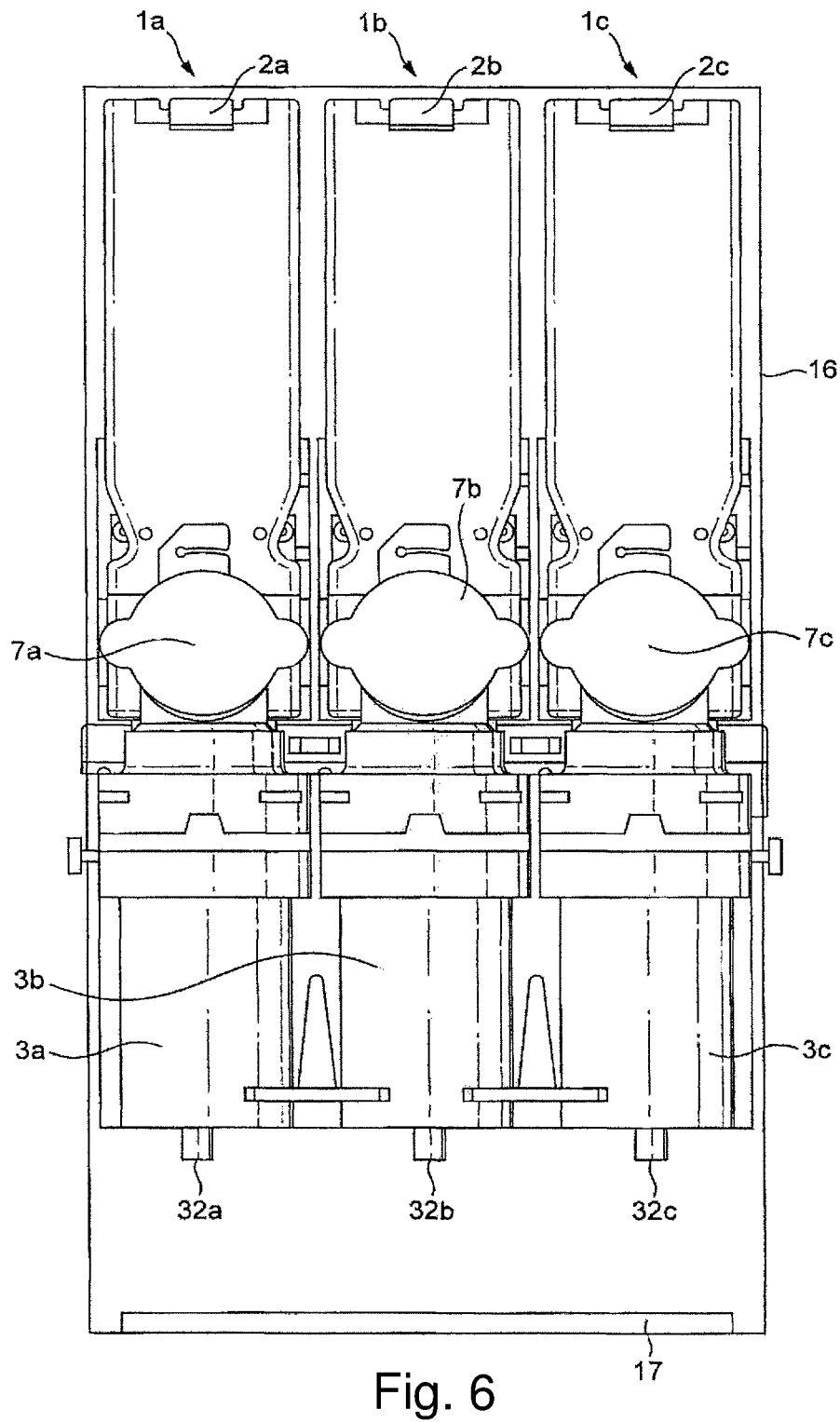
FIG. 6 is a front view of a beverage dispenser comprising three beverage preparation assemblies according to the invention.

FIG. 6 illustrates the front view of the beverage dispenser of FIG. 5 from which the front housing panel has been removed. The dispenser comprises three beverage preparation assemblies 1a, 1b, 1c according to the embodiment described in FIGS. 3A and 3B. Each container 2a, 2b, 2c can store different soluble powder like instant coffee, milk powder and chocolate powder. The assemblies can also differ by the volume of the mixing chambers 3a, 3b, 3c that can depend on the nature of the beverage to be prepared. For example a bigger chamber may be required for preparing a milk beverage compared to a coffee. In this dispenser each beverage preparation assembly is dedicated to the preparation of a particular beverage from the powder stored in the container 2a, 2b, 2c of the assembly. For each specific beverage the assembly forms a powder distributing column dedicated to the preparation of the specific beverage. So no cross contamination can happen in a mixing chamber and each column can remain airtight.

The air outlets of the beverage preparation assemblies are each connected to an extraction duct from which the fan 9 (illustrated in FIG. 5) sucks air. The diluent inlets of the chamber of each assembly are connected to the diluent supply illustrated in FIG. 5.

FIG. 7 illustrates an alternative beverage dispenser wherein the dissolution chamber of FIGS. 1 to 6 is replaced by a dissolution chamber comprising a whipper 35 actuated by a motor 351. The other referenced elements in FIG. 7 are identical to the elements of FIG. 5 presenting the same reference.

In both illustrated dispensers of FIGS. 5 and 7 the fluid system for delivering water to the dissolution chamber can comprise heating and/or cooling devices and valves in order to control the temperature of water and the sequence of introduction of water in the diluent inlets according to the beverage preparation recipe.

Figure 9A:
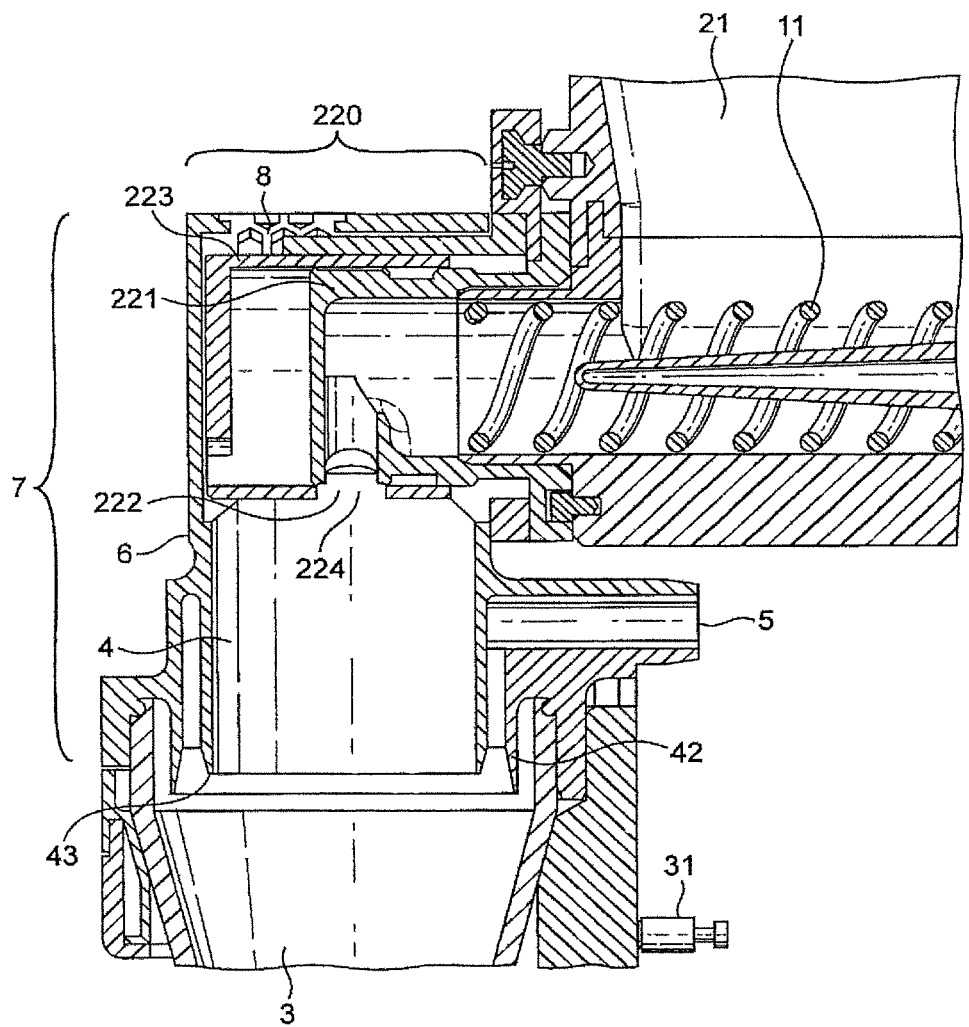
FIGS. 9A and 9B are cross section views of a part of an assembly of the present invention illustrating the movement of the discharge port during beverage preparation.

FIG. 9A is a magnified cross section view of the tank outlet, the discharge port 22 such as illustrated in FIG. 4C, the top of the dissolution chamber and the single piece of material 7 such as illustrated in FIGS. 3A, 3B and 4A.

The discharge port comprises:
an internal delivery tube 221 comprising a hollowing-out 222 in its bottom part,
an external movable cover 223 comprising a hollowing-out 224 in its bottom part.

The internal delivery tube 221 is fixed and attached to the tank outlet. The external movable cover 223 surrounds the internal delivery tube 221 and is able to slide around it according to a translation movement between two positions.

The dimensions of the both hollowing outs 222, 224 and the relative positions of the internal delivery tube 221 and the external movable cover 223 when assembled are configured so that the external movable cover 223 covers at least a part of the internal delivery tube 221 and the hollowing-outs 222, 224 overlap each other in one first position and cannot in the other second position. Then the dimension of the hollowing out 224 of the external movable cover is configured for overlapping at least the hollowing-out 222 of the delivery tube.

In FIG. 9A the discharge port is represented in the second dosing position where the two hollowing outs 222, 224 overlap each other and enable the dispensing of the soluble beverage powder which is pushed by the activation of the dosing means 11.

FIG. 9A illustrates too how the external movable cover 223 during powder dosing is displaced under the air inlet 8 and substantially closes the air inlet during that operation. As a consequence the risk that powder fines escape through the air inlet is even more reduced. Generally during that step of powder dosing the flow rate at which air is sucked through the air outlet is decreased—or even stopped—in order to avoid that powder fines are sucked through the air outlet. A drawback of this sucking decrease could be that potential mist in the dissolution could flow upwardly through the chute by natural convection; yet, the closing of the air path by the end of the external movable cover 223 reduces such a chimney effect by limiting the mist velocity and its chance to flow upwardly.

Figure 9B:
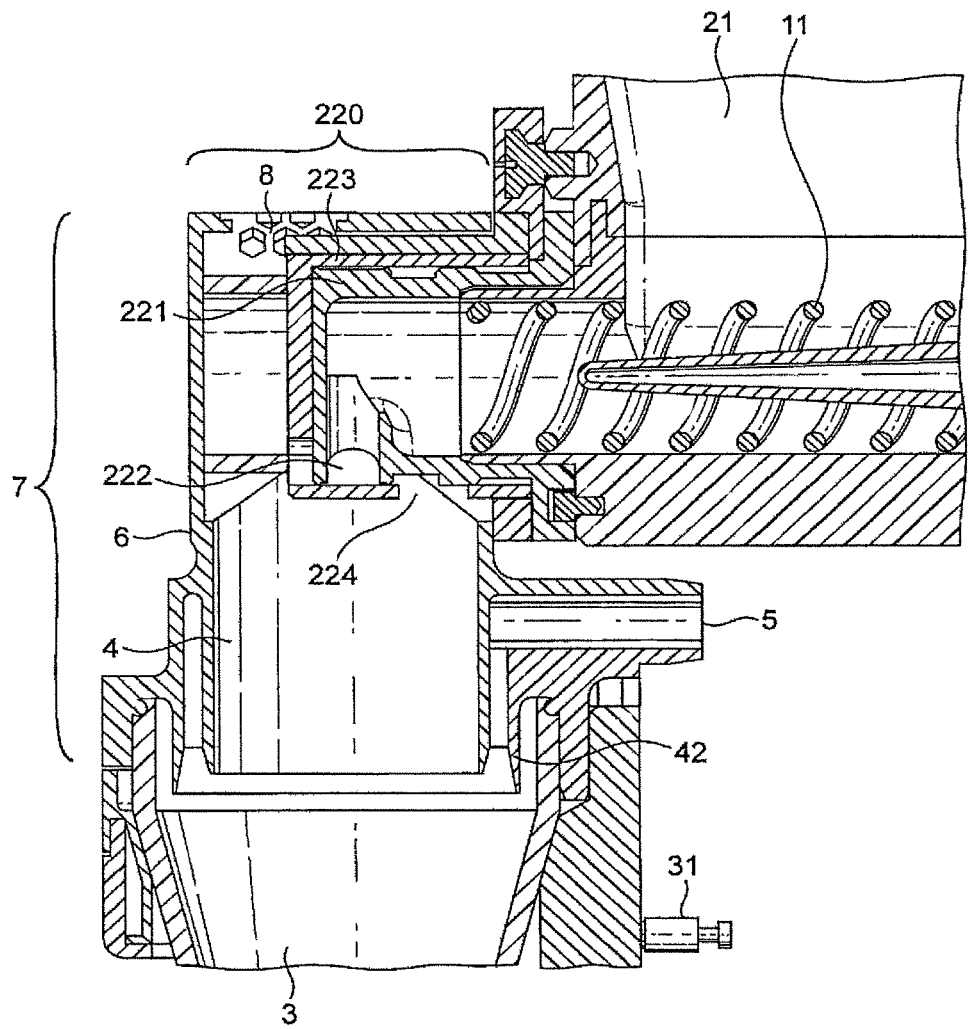

FIG. 9B corresponds to FIG. 9A except that that the external movable cover 223 is in the first rest position where the two hollowing outs 222, 224 do not overlap each other and do not enable the dispensing of the soluble beverage powder.

FIGS. 9A and 9B illustrates dimensions of the chute bottom section, the air inlet section and the air outlet section that enable a control of the air flow in the assembly according to the present invention. The illustrated assembly presents a section S2 at the bottom chute that is circular. The diameter of the bottom chute is of 40 mm which is sufficiently large to limit the risk that the powder falling from the discharge port 220 deposits on the chute. The section S2 is of 1257 mm². By applying a suction of air at a flow rate of 3,8.104 m³/s at the air outlet 5, a velocity V2 of air can be reached at the bottom chute 43 that mist elevating from the dissolution chamber cannot cross. The height between the air inlet 8 and the chute bottom 43 is of about 100 mm.

In the same air sucking conditions the section S1 of the air inlet 8 is of about 200 mm² preferably. In illustrated FIGS. 9A and 9B this section S1 corresponds to the sum of the sections of all the holes in the grid.

In the same air sucking conditions the section S3 of the air outlet 5 (more clearly illustrated in FIG. 3B) presents a section of about 500 mm² preferably.

The present invention presents the advantage of avoiding the escape of powder fines in the machine.

The present invention presents also the advantage of controlling the movement of humidity, steam and vapour generated during the beverage preparation and preventing the presence of humidity above the powder chute.

In particular the present invention presents the advantage of creating separating the path of the powder from the container to the chamber in two zone: an upper dry zone and a lower humid zone.

The assembly of the present invention forms an encapsulated path for the powder and for the flow of air inside the assembly. Due to encapsulation, powder fines do not flow outside the dissolution chamber during dosing. Moreover, due to the encapsulation, the movement of the air can be controlled: air can essentially only enter through the air inlet and essentially only flow out through the air outlet. As a consequence the control of the air flow rate by the sucking device enables a control of the movement and of the velocity of air at the different places of the assembly and in particular at the chute bottom. It becomes possible to create dry and wet zones in the assembly and to prevent humidity from flowing up from the wet zone to the dry zone. Another advantage of the present invention is that the manual cleaning interval of the chute can be optimised: it can be done less frequently and it can be done rapidly since no powder can stick in the chute.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS

1, 1a, 1b, 1c beverage preparation assembly
2, 2a, 2b, 2c container
21 tank
22 powder outlet
220 discharge port
221 internal delivery tube
222 hollow out
223 external movable cover
224 hollow out
3 dissolution chamber
31 diluent inlet
32 beverage outlet
33 chamber opened top
34 chamber top wall
3a connecting means
35 whipper
351 whipper motor
4 chute
41 top of the chute
42 annular ring
421 first internal annular space
422 second external annular space
43 chute bottom
431 bottom wall of the chute
44 superior wall of the chute
5 air outlet
6 conduit
61 first extremity of the conduit
62 second extremity of the conduit
7 single piece of material
7a connecting means
8 air inlet
9 sucking device
91 extraction duct
10 gaskets
11 dosing device
111 motor of the dosing device
12 pump
13 boiler
14 user interface
15 control unit
16 housing
17 dispensing area The invention is claimed as follows:

1. A beverage preparation assembly comprising:
   a container for storing a water soluble beverage powder, the container comprising a tank and a powder outlet;
   a dissolution chamber for preparing a beverage from the water soluble beverage powder and a diluent, the dissolution chamber comprising at last one diluent inlet and a beverage outlet;
   a chute for guiding the water soluble beverage powder from the powder outlet of the container to the dissolution chamber;
   an air outlet configured for evacuating air from the dissolution chamber;
   wherein the powder outlet is connected to the chute by a conduit;
   wherein the powder outlet, the conduit, the chute and the dissolution chamber are connected together through airtight connections; and
   wherein the assembly comprises an air inlet, the air inlet being positioned above the chute only.

2. The beverage preparation assembly according to claim 1, wherein the first extremity of the conduit is connected to the powder outlet, and the second extremity of the conduit is connected to the top of the chute.

3. The beverage preparation assembly according to claim 1 wherein an annular wall surrounds the bottom wall of the chute and defines a first internal annular space between the annular wall and the bottom wall of the chute and a second external annular space between the annular wall and the top wall of the chamber, the first internal annular space being connected to the air outlet configured for evacuating air from the dissolution chamber.

4. The beverage preparation assembly according to claim 1 wherein the chute and the conduit are made of one single piece of material.

5. The beverage preparation assembly according to claim 4 wherein the air outlet is part of the single piece of material.

6. The beverage preparation assembly according to claim 4 wherein the single piece of material comprises:
    a connecting member configured for fitting with a corresponding connector at the top of the dissolution chamber;
    a connecting member configured for fitting with corresponding connector at the powder outlet of the container; and
    a connecting member configured for fitting with an air extraction duct.

7. The beverage preparation assembly according to claim 4, wherein the assembly comprises an annular ring, and the single piece of material comprises the annular ring.

8. The beverage preparation assembly according to claim 1 wherein the powder outlet of the container for storing a water soluble beverage powder comprises:
    an internal delivery tube comprising a hollowing-out in a bottom part of the tube;
    an external movable cover comprising a hollowing-out in a bottom part of the cover, the external movable cover covering at least a part of the internal delivery tube and being movable between:
        a position in which the both hollowing-outs of the internal delivery tube and of the external movable cover overlap each other; and
        a position in which the surface of the external movable cover overlaps and closes the hollowing-out of the delivery tube.

9. A beverage dispenser comprising at least one beverage preparation assembly comprising a container for storing a water soluble beverage powder, the container comprising a tank and a powder outlet, a dissolution chamber for preparing a beverage from the water soluble beverage powder and a diluent, the dissolution chamber comprising at last one diluent inlet and a beverage outlet, a chute for guiding the water soluble beverage powder from the powder outlet of the container to the dissolution chamber, an air outlet configured for evacuating air from the dissolution chamber, the powder outlet is connected to the chute by a conduit, the powder outlet, the conduit, the chute and the dissolution chamber are connected together through airtight connections, and
    the assembly comprises an air inlet, the air inlet being positioned above the chute only.

10. The beverage dispenser according to claim 9 comprising several beverage preparation assemblies, wherein each beverage preparation assembly is dedicated to the preparation of a particular beverage.

11. The beverage dispenser according to claim 10 wherein each air outlet of each beverage preparation assembly is connected to a dedicated extraction duct and a dedicated fan.

* * * * *